(12) United States Patent
Nordin et al.

(10) Patent No.: US 6,925,173 B2
(45) Date of Patent: Aug. 2, 2005

(54) OPTIMIZATION OF A DSL-COMPATIBLE POTS LINE CARD

(75) Inventors: Ronald Alex Nordin, Naperville, IL (US); Carl Robert Posthuma, Wheaton, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 519 days.

(21) Appl. No.: 10/062,686

(22) Filed: Jan. 31, 2002

(65) Prior Publication Data

US 2003/0142815 A1 Jul. 31, 2003

(51) Int. Cl.[7] .............................................. H04M 3/26
(52) U.S. Cl. .................................................. 379/399.01
(58) Field of Search ........................... 379/93, 399.07, 379/398, 22, 32

(56) References Cited

U.S. PATENT DOCUMENTS 5,802,169 A * 9/1998 Frantz et al. ................ 379/398
6,301,337 B1 * 10/2001 Scholtz et al. ................ 379/30
6,317,494 B1 * 11/2001 French et al. .......... 379/399.01
6,633,628 B1 * 10/2003 Linder et al. ............ 379/22.07

FOREIGN PATENT DOCUMENTS

WO     WO 99/52256    * 10/1999    ............ H04M/1/00

* cited by examiner

*Primary Examiner*—Sinh Tran
*Assistant Examiner*—Walter F Briney, III

(57) ABSTRACT

A digital subscriber line (DSL) compatible plain old telephone service (POTS) line card that interface a telecommunications switching system to a subscriber over a two-wire subscriber line, wherein the subscriber line card detects whether a DSL line card is connected to the subscriber line. A digital signal processor on the POTS line card is configured to process voice-band signals with a first set of parameters if a DSL line card is connected to the subscriber line and to process voice-band signals with a second set of parameters if the DSL line card is not connected to the subscriber line. Detecting the presence of a DSL line card may be performed by sending a voice band tone on the subscriber line and the return loss measured. Additionally, a tone above voice band may be sent on the subscriber line and a return loss measured. The first set of parameters adjust frequency response of the subscriber line, return loss of the subscriber line and/or trans-hybrid loss of the POTS line card to compensate for the presence or absence of a DSL card connected to the subsource line.

20 Claims, 6 Drawing Sheets

OPTIMIZATION OF A DSL-COMPATIBLE POTS LINE CARD

FIELD OF THE INVENTION

This invention relates to telephone switching systems and to high-speed data communications, and, more specifically, to maintaining response standards in a line card for analog telephone service whether or not the subscriber line is also used for high-speed data service.

BACKGROUND OF THE INVENTION

Many business and home consumers are requesting faster data access than can be provided by voice-band modems over two-wire subscriber lines. The central office switch, because of the voice band CODEC's, limits the data bandwidth to approximately 56 kbps. In response, both incumbent local exchange carriers (LEC's) and alternative carries are offering digital subscriber line (DSL) service. Basically, DSL uses wide frequency band above the voice frequency to carry more data. The same tip-ring pair that supports voice service can thus also support DSL service without rewiring the extant local telephone system.

When DSL service is added over voice service, several filters and other components are added to the subscriber loop in order to isolate the DSL service from the voice service at both the customer premises and at the central office to avoid one interfering with the other. When these components are added, voice band service is affected negatively. Telcordia (formerly BellCore) specified voice-band characteristics in the LSSGR (LATA Switching System Generic Requirements), now Telcordia GR 507 (local switching) and GR57 (DLC). Currently, when a DSL line card is connected to a POTS line card, the POTS line card does not meet these specifications.

Special line cards have been proposed to meet the requirements while still providing DSL services, but this requires that the POTS line card be changed when DSL service is added. Therefore, a challenge in the art is to develop a POTS line card that can meet LSSGR requirements both when it is and is not connected in circuit with a DSL line card.

SUMMARY OF THE INVENTION

A technical advance is achieved in the art in a digital subscriber line (DSL) compatible plain old telephone service (POTS) line card that interface a telecommunications switching system to a subscriber over a two-wire subscriber line. The POTS line card detects whether a DSL line card is connected to the subscriber line. A digital signal processor on the POTS line card is configured to process voice-band signals with a first set of parameters if a DSL line card is connected to the subscriber line. Further, the digital signal processor on the POTS line card is configured to process voice-band signals with a second set of parameters if the DSL line card is not connected to the subscriber line. Detecting the presence of a DSL line card may be performed by sending one or more tones within the voice band frequency on the subscriber line and measuring return loss. Additionally, one or more tones above voice band frequency (advantageously in the DSL frequency band) may be sent on the subscriber line and a return loss measured.

The first set of parameters adjusts a frequency response of the POTS line card, a return loss of the subscriber line card and/or a trans-hybrid loss of the POTS line card to meet LSSGR specifications when a DSL line card connected to the subscriber line. The second set of parameters adjusts a frequency response of the POTS line card, a return loss of the subscriber line card and/or a trans-hybrid loss of the POTS line card to meet LSSGR specifications when a DSL line card is not connected to the subscriber line.

BRIEF DESCRIPTION OF THE DRAWINGS

A more complete understanding of this invention may be obtained from a consideration of the following description, taken in conjunction with the drawings, in which.

DETAILED DESCRIPTION

Figure 1:
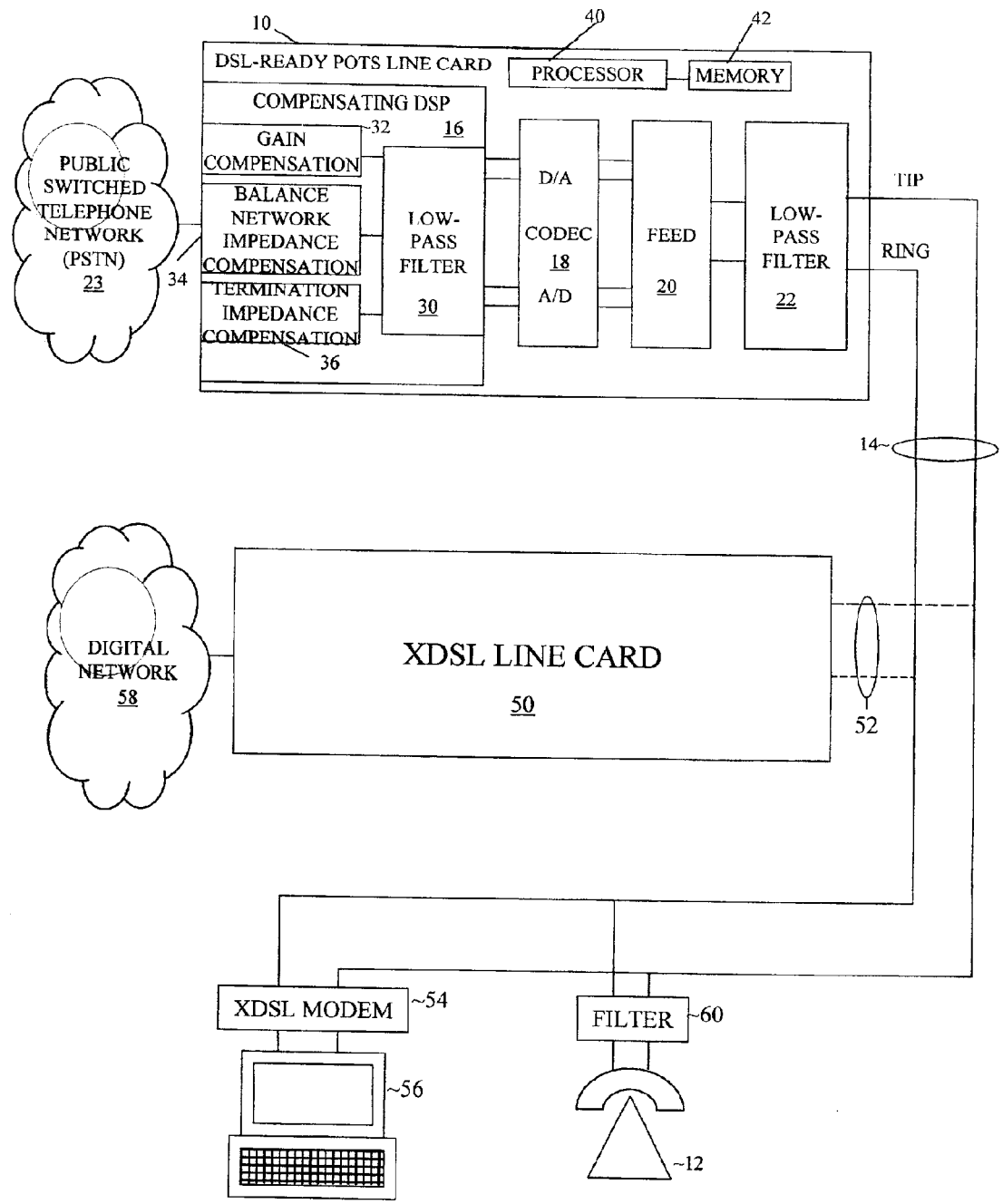
FIG. 1 is a block diagram of a POTS line card connected to a customer premises telephone according to one aspect of this invention.

FIG. 1 is a block diagram of a DSL-compatible POTS line card 10 connected to a customer premises telephone 12 via a tip-ring pair 14 according to one aspect of this invention. The DSL-compatible POTS line card 10 comprises four main components, as opposed to the three main components of a current or prior art POTS line card. The exemplary embodiment of this invention is described in terms of the DSL-compatible POTS line card as described in U.S. patent application Ser. No. 09/617,446, assigned to the assignee of this application and incorporated herein by reference. According to this exemplary embodiment, DSL-compatible POTS line card 10 comprises a compensating digital signal processor ("DSP") 16, a CODEC or digital/analog, analog/digital converter 18 and a battery feed 20. In addition, POTS line card 10 includes a low-pass filter 22. Low-pass filter 22 provides attenuation of the high frequency DSL signal but more importantly lowers the amplitude of any DSL signal from 18 volts peak to peak to between three and five volts peak to peak. In this manner, the signal and voltage is attenuated to that acceptable to a POTS line card, according to prior specifications, if and when a DSL line card is connected to the tip-ring pair 14.

According to this exemplary embodiment, the compensating DSP 16 provides an interface to Public Switched Telephone Network (PSTN) 23. Compensating DSP 16 provides four further functions to its known, prior art functions. DSP 16 also provides a second order low pass filter 30 to further attenuate voltage and filter out any unwanted DSL signal or noise to ensure that the signal is appropriate for POTS. The compensating DSP 16 further includes gain compensator 32 to restore any signal in the voice band (0 to 4 kHz) that may have been attenuated by either of the two low pass filters 22 and 30. This compensation restores some signal that is lost from the nature of filtering, as is known in the art.

There is a balance network impedance compensator 34 in the compensating DSP 16 to bring the balanced network into conformity with standard non-loaded balance network. Further, a termination impedance compensator 36 provides proper termination impedance in PSTN 23.

According to the exemplary embodiment of this invention, a processor 40 controls the functionality of the entire board. Processor is connected to memory 42, which contains a plurality of operational programs for the compensating DSP 16, as will be described further, below. Of course, processor 40 is shown for the sake of clarity; the functionality of processor 40 may be incorporated in any component on POTS line card 10. Advantageously, the functionality of processor 40 is incorporated into DSP 16.

Memory 42 stores a first set of parameters that sets the frequency response, the return loss and the trans-hybird loss of the POTS line card for POTS with DSL service present. Memory 42 stores a second set of parameters that sets the frequency response, the return loss and the trans-hybird loss of the POTS line card for POTS without DSL service present.

To complete the context in which this invention is described, XDSL line card 50 may be connected to tip-ring pair (local loop) 14 by a second tip-ring pair 52 (shown in phantom). XDSL line card 50 connects a digital device, such as PC 56 via XDSL Modem 54 to digital network 58. When XDSL is present on local loop 14, Filter 60 blocks DSL signals from interfering with POTS telephone 12 service, as is known in the art.

Figure 2:
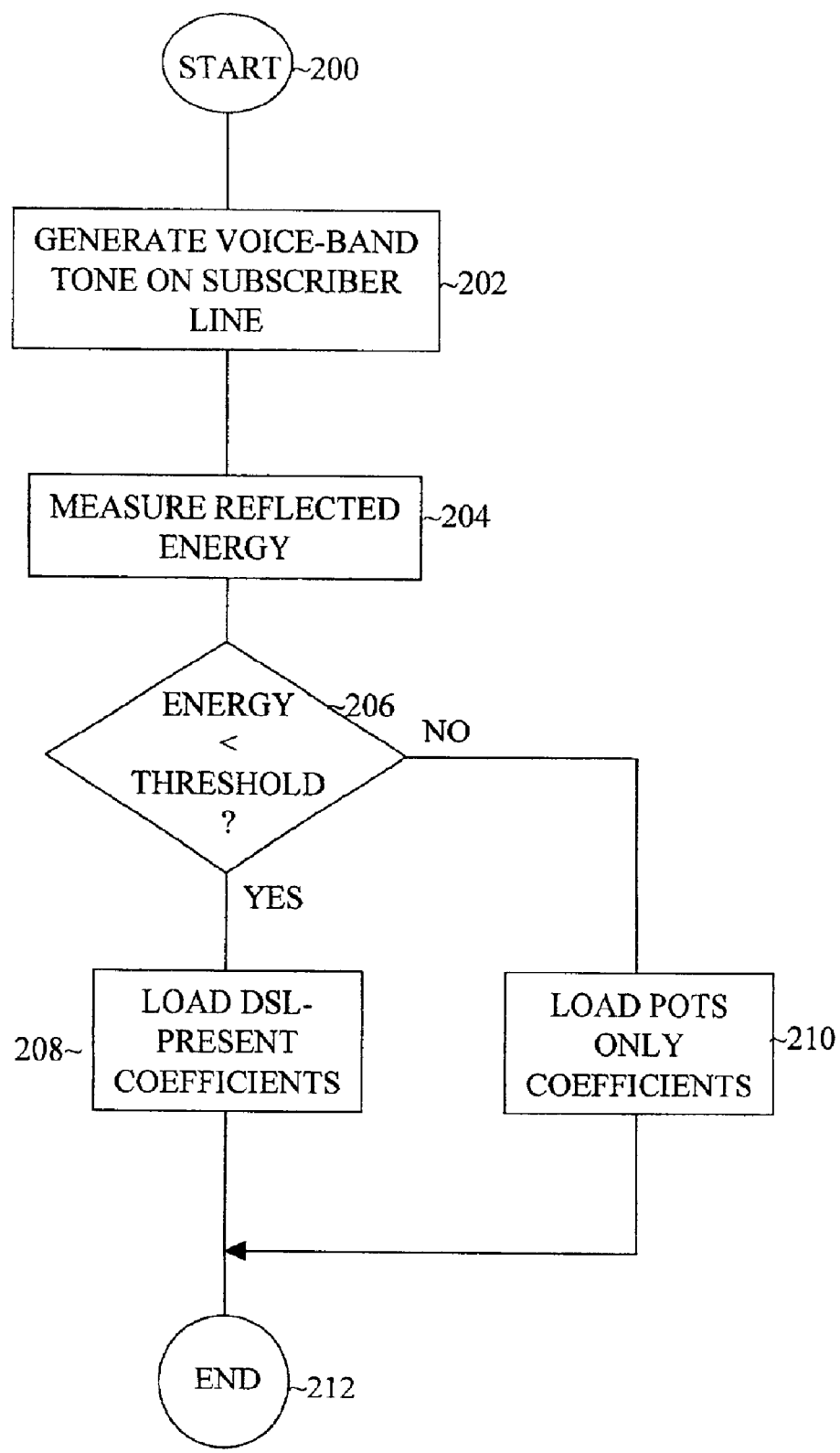
FIGS. 2–6 are flow charts of processing according to exemplary embodiments of this invention.

When a DSL-compatible POTS line card 10 according to this invention is initialized, it determines whether a DSL line card such as 50 is connected to local loop 14. According to one embodiment, as shown in FIG. 2, processing starts at circle 200 and moves to action box 202. In action box 202, the DSP 16 generates a tone in the voice band and plays it on the subscriber line, tip-ring pair 14. The tone may be, for example, 2.4 kHz, 3.0 kHz or 3.4 kHz, depending on the application. Other frequencies may be used without departing from the scope of this invention.

Processing then continues to action box 204, where reflected energy of the tone is measured. As is known in the art, local loop 14 and telephone 12 reflects a percentage of the energy delivered on tip-ring pair 14, with a determinable amount of attenuation. If a DSL card is present, then the attenuation is greater than it would be if only a POTS telephone is connected to the line. Therefore, in decision diamond 206, a determination is made whether the reflected energy is less than a threshold, then a DSL card is present. In this case, processing moves to action box 208 where the DSL present coefficients are loaded into compensating DSP 16.

If, in decision diamond 206, the reflected energy is above the threshold, then a DSL card is not present and the POTS only coefficients are loaded into compensating DSP 16. Processing ends in circle 212.

Figure 3:
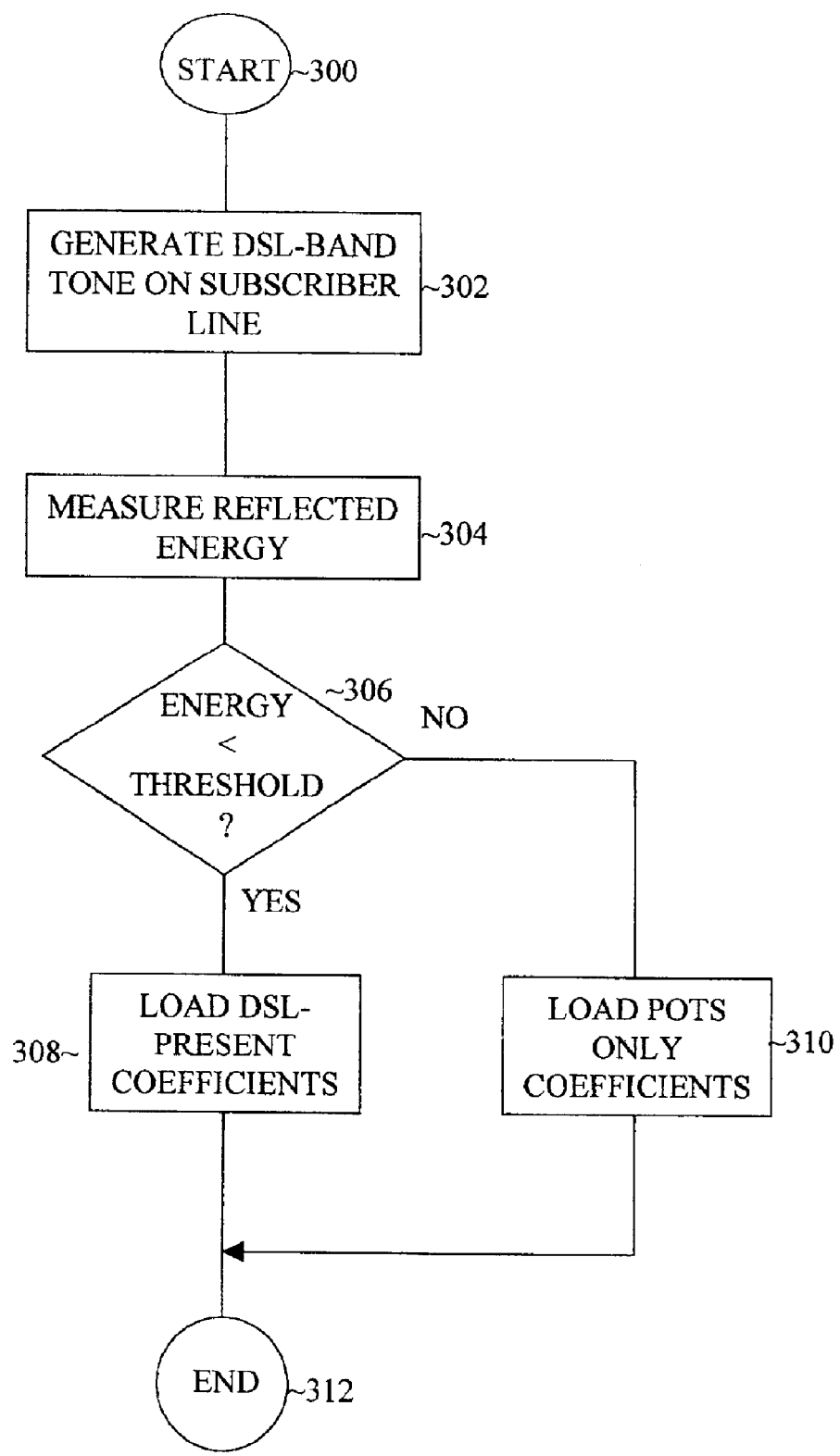

Turning now to FIG. 3, another embodiment of making the determination as to whether a DSL card is present is shown. Processing starts in circle 300 and moves to action box 302, where a tone is generated in the frequency band that is used by DSL. The reflected energy is measured in action box 304, and a determination is made in decision diamond 306 whether the reflected energy is below a threshold. If the reflected energy is below the threshold, then a DSL card is detected, and the DSL present coefficients are loaded into compensating DSP 16 in action box 308. If the reflected energy is above the threshold, then a DSL card is not present and the POTS only coefficients are loaded into compensating DSP 16 in action box 310. Processing ends in circle 312.

Figure 4:
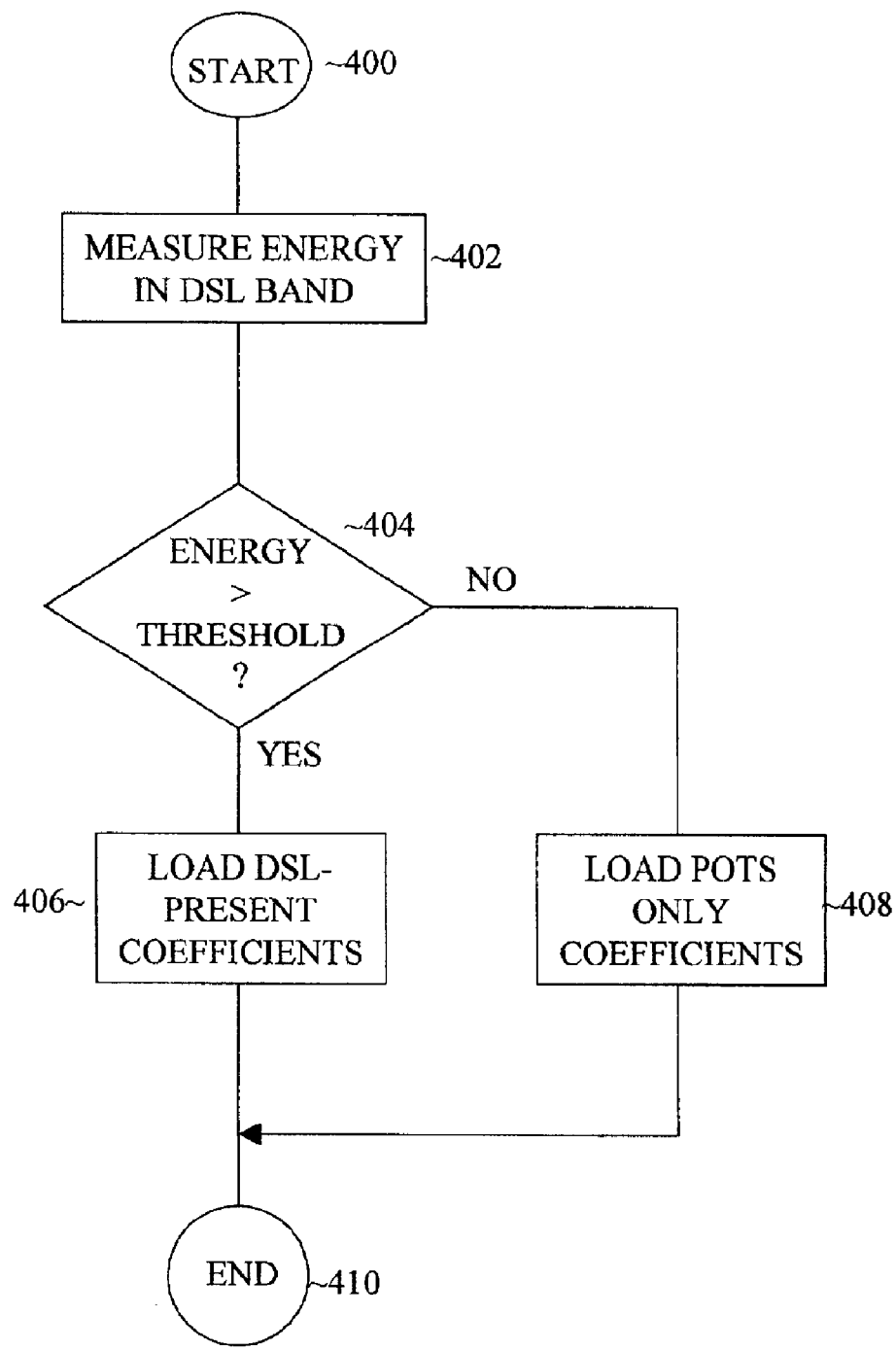

Turning now to FIG. 4, a further embodiment of making the determination as to whether a DSL card is present is shown. Processing starts in circle 400 and moves to action box 402, where energy in the DSL frequency band is measured. A determination is made in decision diamond 404 whether the energy is above a threshold. If the reflected energy is above the threshold, then a DSL card is detected, and the DSL present coefficients are loaded into compensating DSP 16 in action box 406. If the reflected energy is below the threshold, then a DSL card is not present and the POTS only coefficients are loaded into compensating DSP 16 in action box 408. Processing ends in circle 410.

Figure 5:
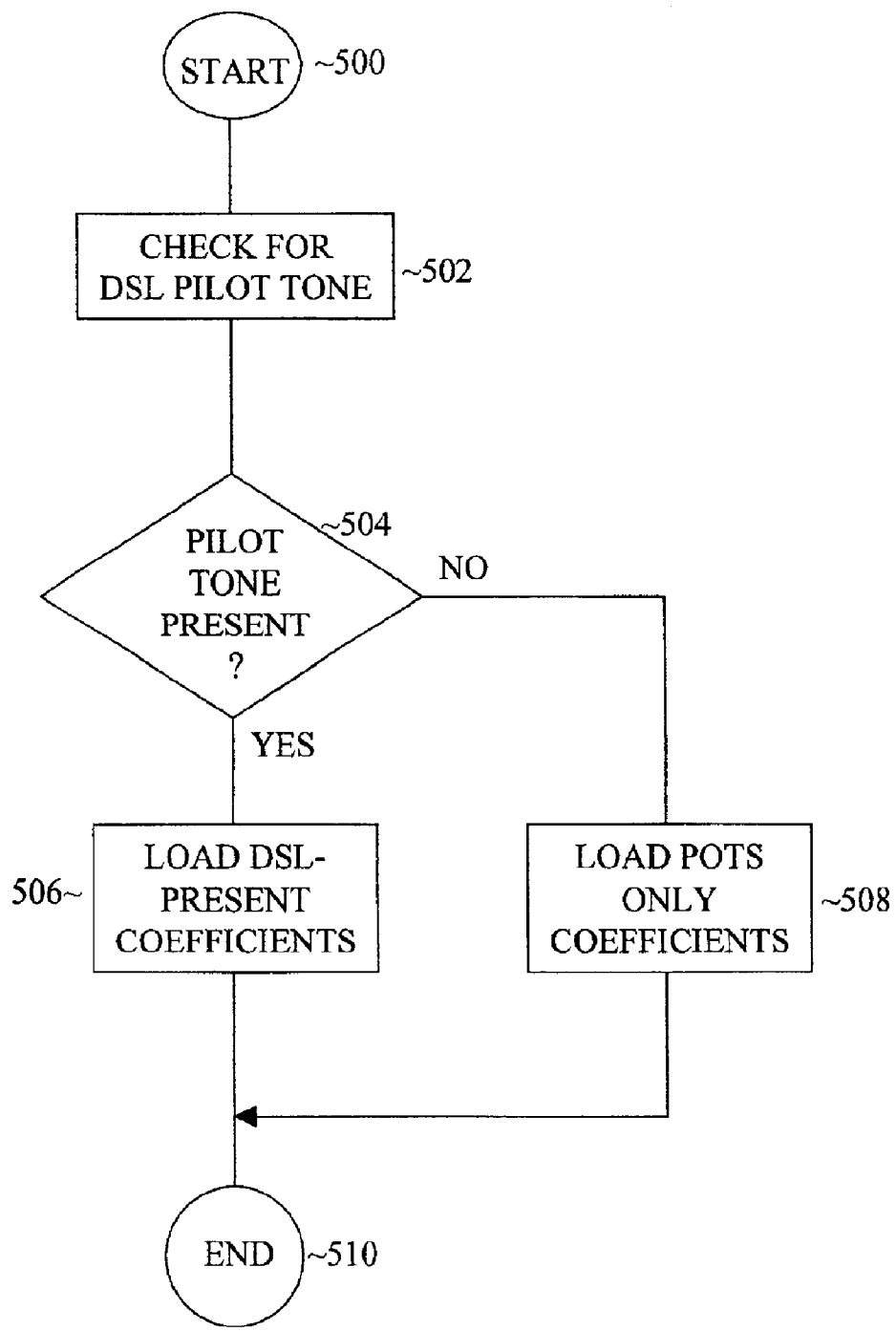

Turning now to FIG. 5, yet another embodiment of making the determination as to whether a DSL card is present is shown. Processing starts in circle 500 and moves to action box 502, where a check is made on tip-ring pair 14 for a DSL pilot tone. A determination is made in decision diamond 504 whether the DSL pilot tone is present. If the DSL pilot tone is present, then a DSL card is detected, and the DSL present coefficients are loaded into compensating DSP 16 in action box 506. If the pilot tone is not detected, then a DSL card is not present and the POTS only coefficients are loaded into compensating DSP 16 in action box 508. Processing ends in circle 510.

Figure 6:
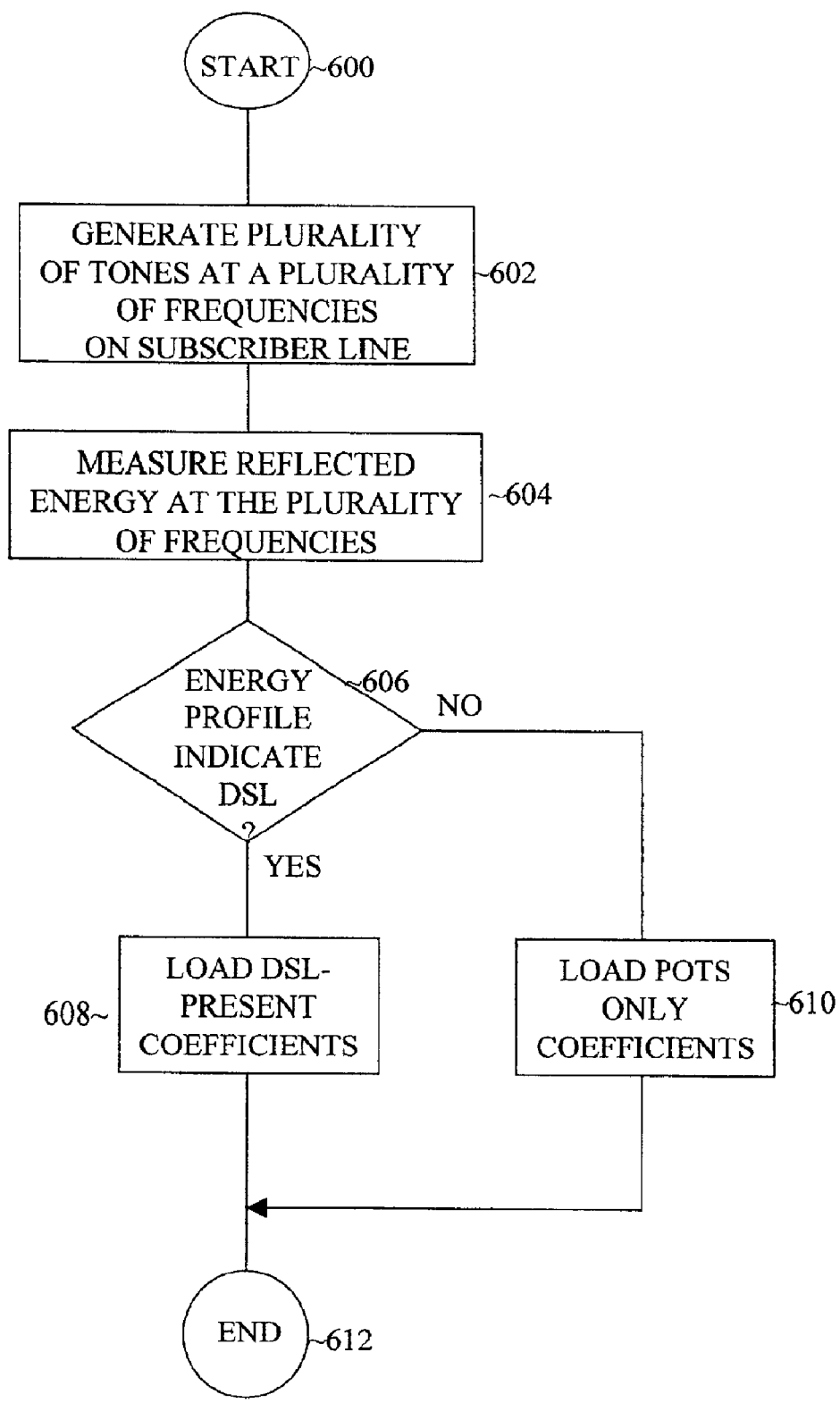

Turning now to FIG. 6, still yet another embodiment of making the determination as to whether a DSL card is present is shown. Processing starts in circle 600 and moves to action box 602 where a plurality of tones are generated at various frequencies. These tones may all be in the voice frequency band, the DSL Frequency band, or, advantageously, frequencies from several points in the local loop range. Processing continues to action box 604 where a reflected energy is measured. A determination is made in decision diamond 606 whether the reflected energy indicates the presence of a DSL card connected to the local loop. In this scenario, one or more profiles may be developed for reflected energy of various frequency patterns. Such patterns are functions of the characteristics of the local loops and are determinable in the laboratory without undue experimentation.

If a reflected energy/frequency pattern is detected, then processing moves to action box 608, where the DSL-Present coefficients are loaded into DSP 16. If a reflected energy/frequency pattern is not present in decision diamond 606, then the POTS-only coefficients are loaded into DSP 16 in action box 610. Processing ends in circle 612.

It is to be understood that the above-described embodiments are merely illustrative of the principles of the invention and that many variations may be devised by those skilled in the art without departing from the scope of the invention. For example, a component on the DSL-ready POTS line card may query a database on the switch to determine if a DSL line card is provisioned on the line, and load compensating DSP 16 accordingly. It is, therefore, intended that such variations be included within the scope of the appended claims.

What is claimed is:

1. A digital subscriber line (DSL) compatible plain old telephone service (POTS) line card to interface a telecommunications switching system to a subscriber over a two-wire subscriber line, said line card comprising:

means for detecting whether a DSL line card is connected to said subscriber line based on an impedance measurement at DSL frequencies; and a digital signal processor responsive to said means for detecting configured to process voice-band signals with a first set of parameters if said DSL line card is connected to said subscriber line and configured to process voice-band signals with a second set of parameters if said DSL line card is not connected to said subscriber line.

2. A DSL-compatible POTS line card in accordance with claim 1 wherein said means for detecting is configured to detect a DSL line card connected to said subscriber line by measuring impedance in said subscriber line.

3. A DSL-compatible POTS line card in accordance with claim 2 wherein a DSL line card is connected when said impedance indicates the presence of approximately 100 ohms at the DSL Frequencies in parallel with the subscriber load.

4. A DSL-compatible POTS line card in accordance with claim 1 wherein said means for detecting is configured to detect a DSL line card connected to said subscriber line by generating a voice band tone, sending the tone on said subscriber line and measuring a reflected energy, wherein a DSL line card is detected when said reflected energy is below, a threshold.

5. A DSL-compatible POTS line card in accordance with claim 4 wherein said voice band tone is selected from the group of 2.6, 3.0 and 4.0 kHz.

6. A DSL-compatible POTS line card in accordance with claim 1 wherein said first set of parameters adjusts a frequency response of said subscriber line.

7. A DSL-compatible POTS line card in accordance with claim 1 wherein said first set of parameters adjusts a return loss of said subscriber line.

8. A DSL-compatible POTS line card in accordance with claim 1 wherein said first set of parameters adjusts a trans-hybrid loss of said POTS line card.

9. A DSL-compatible POTS line card to interface a telecommunications switching system to a subscriber over a two-wire subscriber line, said line card comprising:

means for detecting whether a DSL line card is connected to said subscriber line; and a digital signal processor responsive to said means for detecting configured to process voice-band signals with a first set of parameters if said DSL line card is connected to said subscriber line and configured to process voice-band signals with a second set of parameters if said DSL line card is not connected to said subscriber line;

wherein said means for detecting is configured to detect a DSL line card connected to said subscriber line by generating a tone above voice band, sending the tone on said subscriber line and measuring a return loss, wherein a DSL line card is detected when said return loss is below a threshold.

10. A DSL-compatible POTS line card in accordance with claim 9 wherein said tone is selected from the group of 16 and 24 kHz.

11. A method for use in a DSL-compatible POTS line card connected to a subscriber line, said method comprising the steps of:

determining whether a DSL line card is connected to said subscriber line by measuring an impedance at DSL frequencies;

loading a digital signal processor located in the DSL-compatible POTS line card with a first set of parameters if a DSL line card is connected to said subscriber line; and loading a digital signal processor with a second set of parameters if a DSL line card is not connected to said subscriber line.

12. A method in accordance with claim 11 wherein said step of determining occurs periodically.

13. A method in accordance with claim 11 wherein said step of determining comprises the substeps of: sending a tone on said subscriber line; measuring a reflection of said tone; and basing said determination on a parameter of said reflection.

14. A method in accordance with claim 11 wherein said step of determining comprises: measuring an impedance of said subscriber line.

15. A method for use in a DSL-compatible POTS line card connected to a subscriber line, said method comprising the steps of:

determining whether a DSL line card is connected to said subscriber line;

wherein said step of determining comprises: measuring energy in a DSL frequency range and basing said determination on the presence of energy;

loading a digital signal processor located in the DSL-compatible POTS line card with a first set of parameters if a DSL line card is connected to said subscriber line; and loading a digital signal processor with a second set of parameters if a DSL line card is not connected to said subscriber line.

16. A method for use in a DSL-compatible POTS line card connected to a subscriber line, said method comprising the steps of:

determining whether a DSL line card is connected to said subscriber line;

wherein said step of determining comprises: monitoring said subscriber line for DSL pilot tone;

loading a digital signal processor located in the DSL-compatible POTS line card with a first set of parameters if a DSL line card is connected to said subscriber line; and loading a digital signal processor with a second set of parameters if a DSL line card is not connected to said subscriber line.

17. An apparatus, comprising:

a DSL-compatible POTS line card that comprises a digital signal processor;

wherein the DSL-compatible POTS line card provides an interface from a telecommunications switching system to a subscriber over a two-wire subscriber line;

wherein the DSL-compatible POTS line cain sends a tone at DSL frequencies on the two-wire subscriber line;

wherein the DSL-compatible POTS line card makes a determination of a presence of a DSL line card on the subscriber line based on a measurement of a reflection of the tone;

wherein the digital signal processor processes voice-band signals with a first set of parameters if the DSL line card is present;

wherein the digital signal processor processes voice band signals with a second set of parameters if the DSL line card is not present.

18. The apparatus of claim 17, wherein the measurement of the reflection of the tone comprises a measurement of impedance of the tone at the DSL frequencies.

19. The apparatus of claim 18, wherein the measurement of the impedance of the tone at the DSL frequencies indicates a presence of approximately 100 ohms at the DSL frequencies.

20. The apparatus of claim 17, wherein the first set of parameters comprises one or more of a frequency response of said subscriber line, a return loss of said subscriber line, and/or a trans-hybrid loss of said POTS line card.

* * * * *